US008730867B2

(12) United States Patent
Defrance et al.

(10) Patent No.: US 8,730,867 B2
(45) Date of Patent: May 20, 2014

(54) CLOCK SYNCHRONIZATION AID DEVICE FOR COMMUNICATION STATION(S) OF A WIRELESS NETWORK, AND ASSOCIATED CLOCK SYNCHRONIZATION DEVICE

(75) Inventors: Serge Defrance, Rennes (FR); Ludovic Jeanne, Rennes (FR); Thierry Tapie, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1462 days.

(21) Appl. No.: 12/011,855

(22) Filed: Jan. 30, 2008

(65) Prior Publication Data

US 2008/0186906 A1    Aug. 7, 2008

(30) Foreign Application Priority Data

Feb. 5, 2007    (FR) ..................... 07 53069

(51) Int. Cl.
*H04B 7/212*    (2006.01)
(52) U.S. Cl.
USPC .......................................... 370/324
(58) Field of Classification Search
USPC .......................................... 370/324
See application file for complete search history.

(56) References Cited

U.S. PATENT DOCUMENTS

| 7,633,870 | B2 * | 12/2009 | Elliot | 370/235 |
|---|---|---|---|---|
| 7,730,230 | B1 * | 6/2010 | Kondapalli | 710/15 |
| 8,126,019 | B2 * | 2/2012 | Schultze | 370/503 |
| 2004/0233905 | A1 * | 11/2004 | Weber | 370/389 |
| 2006/0153245 | A1 * | 7/2006 | Schultze | 370/503 |
| 2007/0008993 | A1 * | 1/2007 | Cha et al. | 370/509 |
| 2009/0204811 | A1 * | 8/2009 | Fries et al. | 713/160 |
| 2009/0310726 | A1 * | 12/2009 | Alankry et al. | 375/359 |

FOREIGN PATENT DOCUMENTS

| JP | 2005217787 | 8/2005 |
|---|---|---|
| JP | 2006517358 | 7/2006 |
| JP | 2009527152 | 7/2009 |
| WO | WO2004075445 | 9/2004 |
| WO | WO 2006/063922 A | 6/2006 |
| WO | WO2007092997 | 8/2007 |

OTHER PUBLICATIONS

Precison Clock Synchronization Protocol for Networked Measurement and Control Systems; IEC 61588; 2004.*
Kannisto et al. "Software and Hardware Prototypes of the IEEE 1588 Precision Time Protocol on Wireless LAN", Sep. 18, 2005.*
Kannisto et al. "Software and Hardware Prototypes of the IEEE 1588 Precision Time Protocol on Wireless LAN", IEEE Workshop on Local and Metropolitan Area Networks (LANMAN 2005), 2005.*
Search Report.

(Continued)

*Primary Examiner* — Asad Nawaz
*Assistant Examiner* — Saad A Waqas
(74) *Attorney, Agent, or Firm* — Myers Wolin LLC

(57) ABSTRACT

A device (DA1) is intended to aid a clock synchronization device (DS1) of a master station (SM) of a wireless network in performing time synchronizations, this master station (SM) comprising a master clock (HM) represented by the value of a master counter (CM) and means (MG1) for generating wireless frames of IP packets containing in particular PTP messages of first and second types. The aid device (DA1) comprises detection means (MD1) for, in case of detection by the physical layer of the master station (SM) of a frame pulse received from the network, triggering the sampling of the value of the master counter (CM).

5 Claims, 2 Drawing Sheets

(56) References Cited

OTHER PUBLICATIONS

Search Report Aug. 21, 2007.
Kannisto J. et al. "Software and Hardware Prototypes of the IEEE 1588 Precision Time Protocol on Wireless LAN" Local and Metropolitan Area Networks, 2005. LANMAN 2005. The 14th IEEE Workshop on Chania, Crete, Greece Sep. 18-21, 2005, Piscataway, NJ USA, IEEE, Sep. 18, 2005 p. 1-6 XP010854276, ISBN: 0-7803-9565-4.
Kannisto J. et al. "Precision Time Protocol Prototype on Wireless LAN" Telecommunications and Networking-ict 2004 Lecture Notes in Computer science; LNCS, Springer-Verlag, BE vol. 3124, 2004, pp. 1236-1245, XP019009251 ISBN: 3-540-22571-4.
Gramann T. et al. Precision Time Protocol IEEE 1588 in Der Praxis Zeitsynchronisation IM Submikrosekundenbereich Poing, DE,, vol. 52,No. 24, Nov. 25, 2003, pp. 86-91, 93, XP001177441 issn: 0013-5658.
IEC 61588: IEE 1588: Precision Clock Synchronization Protocol for Networked Measurement and Control Systems: international standard—IEC, New York, NY, US, No. 61588, Sep. 2004, page complete, XP002367391.
Jasperneite J. et al.: "Enhancements to the Time Synchronization Standard IEEE—1588 for a System of Cascaded Bridges" Factory Communication System, 2004. Proceedings. 2004 IEEE International Workshop on Vienna, Austria Sep. 22-24, 2004, Piscataway, New Jersey USA IEEE, Sep. 22, 2004, p. 239-244, XP010756406 ISBN: 0-7803-8734-1.

* cited by examiner

CLOCK SYNCHRONIZATION AID DEVICE FOR COMMUNICATION STATION(S) OF A WIRELESS NETWORK, AND ASSOCIATED CLOCK SYNCHRONIZATION DEVICE

TECHNICAL FIELD OF THE INVENTION

This application claims the benefit, under 35 U.S.C. §119, of European Patent Application No. 0753069 filed Feb. 5, 2007.

The invention relates to wireless communication networks, and more specifically to the synchronization of the slave clocks of the slave communication stations of such networks on the master clock of a master communication station.

Hereinafter, the term "wireless communication network" will be understood to mean any type of communication network capable of transmitting by waves, via an air interface, wireless frames of IP (Internet Protocol) packets. Consequently, it can equally be a mobile telephone network (having a radio interface), such as, for example, a mobile or cellular network (GSM, GPRS/EDGE, UMTS or CDMA2000, and all their variants and all their equivalents), or a wireless local area network having a radio interface offering IP access (WLAN (Wireless Local Area Network—IEEE 802.11, Wi-Fi, ETSI HiperLAN/2), Bluetooth (IEEE 802.15), WiMAX (IEEE 802.16, ETSI HiperMAN) and Zigbee standards).

Moreover, the term "communication station" will be understood here to mean any type of communication equipment forming part of, or capable of being connected to, a wireless (communication) network and having an internal clock of master or slave type. It can therefore be, for example, a base station (BTS or node B), an access point, a mobile telephone, a portable computer, a personal digital assistant (PDA) or a "smartphone" equipped with a wireless communication card. A master station is a station which includes a master clock on which the clocks of the slave stations must be synchronized, both in frequency and in phase. In other words, a master station provides the timing for a number of slave stations.

STATE OF THE ART

As those skilled in the art know, the IEC 61588 standard was proposed to allow for synchronizing with a high degree of accuracy, both in frequency and in phase, the clocks of a set of slave stations, connected to a wired local area network (of LAN type) offering IP access and using the Ethernet protocol, relative to the master clock of a master station also connected to this wired local area network.

It should be remembered that the Ethernet protocol is a packet-switched network protocol which relates to the physical layer (PHY) and the. MAC (Medium Access Control) sublayer of the OSI layer model.

The abovementioned clock synchronization relies on the use of a protocol for which the acronym is PTP (Precision Time Protocol). It is implemented in the master and slave stations by clock synchronization devices that they include. It is done by exchanging specific messages between the master station and the slave stations, and in particular the message called "synchronization message", hereinafter called message of the first type, the message called "follow-up message", hereinafter called message of the second type, the message called "delay request message", hereinafter called message of the third type, and the message called "delay response message", hereinafter called message of the fourth type.

More specifically, the master station periodically transmits to the slave stations (in point-to-multipoint (or multicast) mode), typically each second, a message of the first type followed by a message of the second type. The message of the first type (synchronization message) is intended to notify the slave stations that they will receive the image of the sampling of the value (T1) of the master counter that represents the reference time of the master clock at the moment of the transmission of said message of the first type. The message of the second type (follow-up message) contains this image of the sampling of the value (T1) of the master counter.

On its side, each slave station periodically transmits to the master station, typically every 20 seconds, a message of the third type (delay request message) asking it to send to it in return a message of the fourth type (delay response message) containing an image of the sampling of the value (T4) that its master counter presented at the moment of reception of the message of the third type.

When a slave station receives a message of the first type, its clock synchronization device stores the image of the sampling of the value (T2) of its slave counter at the moment of the reception of said message of the first type. Consequently, when it receives the message of the second type that follows this message of the first type, its clock synchronization device can extract from it the value T1. The difference T2−T1 is equal to the synchronization offset between the slave and master clocks (Δ) plus the transmission delay (D), or T2−T1=Δ+D. The transmission delay (D) is assumed constant in both transmission directions when the master and slave stations are connected by a single Ethernet link.

Similarly, when a slave station transmits a message of the third type, its clock synchronization device stores the image of the sampling of the value (T3) of its slave counter at the moment of the transmission of said message of the third type. And, when it receives the message of the fourth type that responds to this message of the third type, its synchronization device can extract from it the value T4. The difference T3−T4 is equal to the synchronization offset between the slave and master clocks (Δ) minus the transmission delay (D), or T3−T4=Δ−D.

Consequently, it is sufficient for the clock synchronization device of the slave station to add the difference T3−T4 to the difference T2−T1, then divide the result of this addition by two to obtain the value Δ of the synchronization offset of its slave clock relative to the master clock. The synchronization device of the slave station can then send to the local slave clock an instruction intended to cancel the value Δ of its synchronization offset.

The precision of this synchronization depends on the time precision of the sampling operations of the counter values. This time precision itself depends on the instant of transmission or of reception of a PTP message, which is defined by a time marker (or "PTP timestamp point") determined by the station concerned (master or slave).

SUMMARY OF THE INVENTION

In the case of an Ethernet link (wired network), the instant of determination by a station (master or slave) of a time marker is defined by the instant of passage of the first bit of the first octet that follows the octet called "start frame delimiter" within the Ethernet frame that contains the IP packet containing the PTP message to be marked. This is made possible by the fact that an Ethernet frame contains only one IP packet that entirely contains a PTP message.

In the case of a wireless network, such a determination is not possible because the physical layer (PHY-OSI model)

differs from that of an. Ethernet network, unlike the layers located above this physical layer which are identical. The PTP message may still be contained in a single IP packet, but there is no longer the concept of single frame (similar to the Ethernet frame) surrounding each IP packet. It should in effect be recalled that, in a wireless network, in order to optimize the bandwidth and avoid collisions of IP packets coming from different sending stations, the IP packets are grouped together within wireless frames which all have the same duration and are transmitted and received at predetermined instants defined by a structure describing the composition of the MAC frame and positioned at the frame start. With this structure, which is periodically and synchronously reproduced for all the stations, it is possible to define what are called "frame pulses" (or "wireless frame pulses") which are transmitted to all the stations (master and slave) and which are the same for all these stations. A frame pulse therefore defines for each station a common event where all the stations perform a measurement at the moment when this occurs. Preferably, the frame pulse is located at the start of an MAC frame, more specifically on the synchronization symbol that precedes the frame, even more specifically at the start of the symbol.

The aim of the invention is therefore to enhance the accuracy of the synchronization of the clocks in the wireless networks offering IP access.

To this end, the invention proposes to use the frame pulses as sampling instants of the master and slave counters (instants called "message timestamp points" in the IEC 61588 standard in the case of an 802.3 (Ethernet) physical layer).

More specifically, the invention firstly proposes a first time synchronization aid device for a clock synchronization device forming part of a master station of a wireless (communication) network capable of transporting IP packet frames, this master station comprising, on the one hand, a master clock defining a reference time represented by the value of a master counter, and on the other hand, generation means for generating in the form of wireless frames of IP packets, addressed to at least one slave station of the wireless network, PTP (Precision Time Protocol) messages of a first type and of a second type. Each message of the first type is here intended to signal the transmission in the message of the second type that follows it of an image of the sampling of the value that the master counter presented when it was generated.

This first aid device is characterized by the fact that it comprises detection means for, in case of detection by the physical layer (PHY) of its master station of a frame pulse received from the network, triggering the sampling of the value of the master counter. Thus, the sampling instant of the master counter can be used to define the time marker of a PTP message.

The first aid device according to the invention can include other characteristics that can be taken separately or in combination, and in particular:

its detection means can be required, following the triggering of a sampling of the value of the master counter, to detect whether a wireless frame, which is currently being transmitted by its master station, contains at least a chosen part of a message of the first type (PTP), and if it does, to associate with this wireless frame this sampling of the value of the master counter, and, if the wireless frame actually contains a message of the first type, to alert the clock synchronization device for it to supply the image of this sampling to the generation means for them to incorporate it in the message of the second type that follows this message of the first type;

it can comprise, on the one hand, first storage means for storing the sampling of the value of the master counter in case of detection of the chosen message part by the detection means, and on the other hand, second storage means for storing the sampling of the value of the master counter that is stored in the first storage means when a PTP message which has been transmitted in full is actually of the first type (and therefore before the first storage means store a new sampling of the value of the master counter following a new detection of a chosen message part). In this case, the detection means can be required, in case of detection of a wireless frame containing a message of the first type, to alert the synchronization device for it to supply the image of the sampling of the value that is stored in the second storage means to the generation means in order for them to incorporate it in the message of the second type that follows the message of the first type detected by the detection means;

its detection means can also be required to detect whether a wireless frame, which is currently being received in the master station, contains at least a chosen part of a PTP message of the third type which originates from a slave station and which requests the sending to the latter of a PTP message of the fourth type, and if it does, to associate with this wireless frame the image of the sampling of the value of the master counter that corresponds to the last frame pulse preceding the moment of detection of this chosen part of the message of the third type, and if the wireless frame actually contains a message of the third type, to alert the clock synchronization device for it to supply this image of the sampling of the value to the generation means for them to incorporate it in a message of the fourth type responding to the message of the third type received.

The invention also proposes a first clock synchronization device intended to be implemented in a master station of a wireless network and equipped with a first time synchronization aid device of the type of that described hereinabove.

The invention also proposes a second time synchronization aid device for a clock synchronization device of a slave station of a wireless network capable of transporting IP packet frames, this slave station comprising a slave clock defining a local time represented by the value of a slave counter, and reception means for receiving wireless frames of IP packets originating in particular from a master station of the network, which has a master clock defining a reference time represented by the value of a master counter.

This second aid device is characterized by the fact that it comprises detection means required, in case of detection by the physical layer (PHY) of its master station of a frame pulse received from the network, to trigger the sampling of the value of the slave counter. Thus, the sampling instant of the slave counter can be used to define the time marker of a PTP message.

The second aid device according to the invention can include other characteristics which can be taken separately or in combination, and in particular:

its detection means can be required, following the triggering of a sampling of the value of the slave counter, to detect whether a wireless frame, which is currently being received by its slave station, contains at least a chosen part of a message of the first type (PTP), and if it does, to associate with this wireless frame this sampling of the value of the slave counter, and if the wireless frame actually contains a message of the first type, to alert the clock synchronization device for it to use this value to synchronize the slave clock on the master clock;

it can comprise, on the one hand, first storage means for storing the sampling of the value of the slave counter in case of detection of the chosen message part by the detection means, and on the other hand, second storage means for storing the sampling of the value of the slave counter, which is stored in the first storage means, when a PTP message that has been received in full is actually of the first type (and therefore before the first storage means store a new sampling of the value of the master counter following a new detection of a chosen message part). In this case, the detection means can be required, in case of detection of a wireless frame containing a message of the first type, to alert the clock synchronization device for it to use the image of the sampling of the value that is stored in the second storage means to synchronize the slave clock on the master clock;

its detection means can be required to detect whether a wireless frame, which is currently being transmitted by the slave station, contains at least a chosen part of a PTP message of the third type which is addressed to the master station and which requests the sending to the latter of a PTP message of the fourth type, and if it does, to associate with this wireless frame the image of the sampling of the value of the slave counter that corresponds to the last frame pulse preceding the moment of detection of this chosen part of the message of the third type, and if the wireless frame actually contains a message of the third type, to alert the clock synchronization device for it to use this value to synchronize the slave clock on the master clock.

The invention also proposes a second clock synchronization device intended to be implemented in a slave station of a wireless network and equipped with a second time synchronization aid device of the type of that described hereinabove.

This second clock synchronization device can, for example, comprise analysis means for:

when the reception means receive a frame containing a message of the second type that follows another frame containing a message of the first type, extracting from this message of the second type the image of the sampling of the value of the master counter that it contains, and determining the image of the sampling of the value associated with the message of the first type by the detection means, and when the reception means receive a frame containing a PTP message of a fourth type that follows the transmission of a frame containing a message of the third type, extracting from this message of the fourth type the image of the sampling of the value of the master counter that it contains, and determining the image of the sampling of the value associated with the message of the third type by the detection means, and synchronizing the slave clock on the master clock according to these four value sampling images.

BRIEF DESCRIPTION OF THE DRAWINGS

Other characteristics and advantages of the invention will become apparent from studying the detailed description below, and the appended drawings, in which.

The appended drawings can not only serve to complement the invention, but also contribute to its definition, as appropriate.

DETAILED DESCRIPTION

The object of the invention is to provide for an accurate synchronization of the clocks of the slave stations of a wireless network offering IP access, based on the PTP (Precision Time Protocol) synchronization protocol.

Hereinafter, it will be assumed by way of non-limiting example that the wireless network offering IP access is a wireless local area network having a radio interface offering IP access, such as, for example, a WiMAX type network (IEEE 802.16 where appropriate). However, the invention is not limited to this type of wireless network. It relates in effect to any type of communication network capable of transmitting by waves, via an air interface, wireless frames of IP packets. Consequently, the network can also be a mobile telephone network (having a radio interface), such as, for example, a mobile or cellular network (GSM, GPRS/EDGE, UMTS or CDMA2000, and all their variants and all their equivalents), or a wireless local area network having a radio interface offering IP access (WLAN (IEEE 802.11, Wi-Fi, ETSI HiperLAN/2), Bluetooth (IEEE 802.15), WiMAX (ETSI HiperMAN) and Zigbee standards).

The invention relates equally to the master stations and the slave stations of a wireless network. It should be recalled that a wireless network can include either several master stations with each of which is associated a group of slave stations, or a single master station with which are associated all the slave stations.

In the case of a WiMAX network, each master station is, for example, an access point, whereas the slave stations are, for example, subscriber stations, such as, for example, mobile or portable user terminals.

As a general rule, a master station is a station that includes a master clock on which the clocks of the slave stations must be synchronized, both in frequency and in phase. Consequently, a master station can be, for example, a base station (BTS or Node B) or an access point, and a slave station can be, for example, a mobile telephone, a portable computer, a personal digital assistant (PDA) or a "smartphone" equipped with a wireless communication card.

Since the PTP protocol has already been described in the introductory part, it will not be described again hereinafter. It will simply be recalled that it relies mainly on the exchange of PTP messages of a first type ("synchronization message"), of a second type ("follow up message"), of a third type ("delay request message") and of a fourth type ("delay response message"). The messages of the first, second and fourth types are generated by a master station and are addressed to the slave stations that are associated with it. The messages of the third type are generated by the slave stations and are addressed to the master station with which they are associated.

Figure 1:
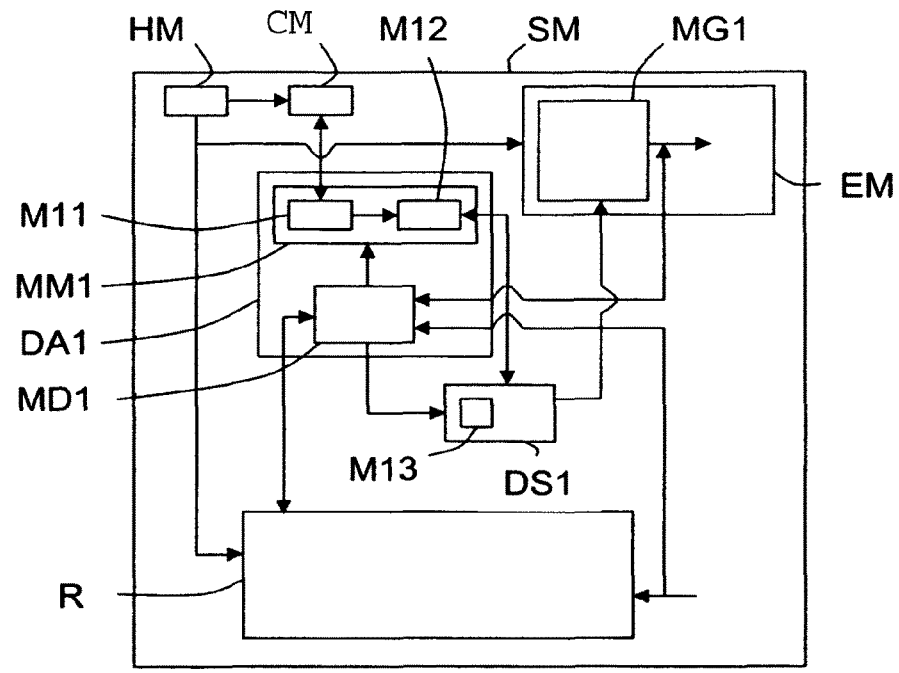
FIG. 1 very schematically and functionally illustrates an exemplary master communication station equipped with an exemplary embodiment of a first synchronization aid device according to the invention coupled to a first exemplary embodiment of a first clock synchronization device, FIG. 2 very schematically and functionally illustrates an exemplary master communication station equipped with a second exemplary embodiment of a first clock synchronization device according to the invention, comprising an exemplary embodiment of a first synchronization aid device according to the invention, FIG. 3 very schematically and functionally illustrates an exemplary slave communication station equipped with an exemplary embodiment of a second synchronization aid device according to the invention coupled to a first exemplary embodiment of a second clock synchronization device, FIG. 4 very schematically and functionally illustrates an exemplary slave communication station equipped with a second exemplary embodiment of a second clock synchronization device according to the invention, comprising an exemplary embodiment of a second synchronization aid device according to the invention.

Reference is first of all made to FIG. 1 to describe an implementation of the invention in a master station SM.

The master station SM comprises a master clock HM which defines a time reference represented by the value of a master counter CM. The slave stations (SE) must synchronize their local slave clocks (HE) on this reference time.

The invention proposes to equip each master station SM forming part of a wireless network with a time synchronization aid device DA1 and a clock synchronization device DS1. In the non-limiting example illustrated in FIG. 1, the (first) time synchronization aid device DA1 is simply coupled to the (first) clock synchronization device DS1, whereas in the non-limiting example illustrated in FIG. 2, the (first) time synchronization aid device DA1 is part of a (second) clock synchronization device DS1'.

According to the invention, a first time synchronization aid device DA1, hereinafter called first aid device DA1, comprises at least one detection module MD1 for analysing the wireless frames that are currently being transmitted or received in its master station SM. To do this, the detection module MD1 observes, on the one hand, the wireless frames that are generated by a frame generation module MG1 of the transmission module EM of the master station SM, at the physical layer level (PHY-OSI model), and on the other hand, the wireless frames that are received by the reception module RM of the master station SM. The transmission module EM and the reception module RM can, if necessary, be part of a transceiver.

The detection module MD1 is preferably arranged in the form of software modules which are, for example, implemented in a central processing unit (CPU) of the master station SM.

At least a part of the first clock synchronization device DS1 is preferably arranged in the form of software modules which are, for example, implemented in the central processing unit (CPU) of the master station SM.

The frame generation module MG1 is required, within the transmission module EM, to generate according to received instructions any type of frame (wireless, of IP packets), and in particular those that form PTP messages of the first, second and fourth types. It is the (first) clock synchronization device DS1 which supplies the frame generation module MG1 with the instructions needed to generate the frames that form the PTP messages of the first, second and fourth types.

The detection module MD1 intervenes each time the physical layer (PHY) of its master station SM detects among the wireless frames received by the reception module RM a frame pulse (or "wireless frame pulse"). It should be recalled that the wireless network periodically transmits (for example every 5 ms), to all the master stations SM and slave stations SE, a frame pulse defining the occurrence of an event that occurs synchronously on all the stations. Each time the physical layer detects a frame pulse, it alerts the detection module MD1 which immediately triggers an operation to sample the value of the master counter CM. Thus, and as will be seen hereinbelow, the sampling instant of the master counter CM can be used to define the time marker of a PTP message.

In addition, the detection module MD1 preferably analyses the contents of the frames (generated by the frame generation module MG1 and therefore currently being transmitted) in order to detect those which contain at least a chosen part of a message of the first type.

For example, the message part being sought is the destination IP address which, by definition according to Appendix D of the 61588 standard, has only four possible values (reserved) for a PTP message (224.0.1.129, 224.0.1.130, 224.0.1.131 and 224.0.1.132), and the destination port number, which, for a PTP message of type one (1) has the value 319 (again according to Appendix D of the 61588 standard).

If the detection module MD1 detects the message part being sought in a wireless frame currently being transmitted, it associates with this wireless frame the sampling of the value (T1) of the master counter CM (of its master station SM) obtained on the detection of the very last frame pulse by the physical layer. Furthermore, if, at the end of the transmission of all of this wireless frame, the detection module MD1 notices that it actually contains a message of the first type, then it alerts the (first) clock synchronization device DS1. The latter can then supply the generation module MG1 with the image of the sampling of the value T1 that has been associated with the frame containing the message of the first type for it to incorporate it in a wireless frame containing a message of the second type which, according to the IEC 61588 standard, must be transmitted to the slave stations (in point-to-multi-point mode) after the message of the first type.

As will be seen in detail below with reference to FIGS. 3 and 4, when a slave station SE receives the wireless frame that contains the message of the first type, its (second) synchronization device DS2 stores the image of the sampling of the value T2 of the slave counter CE (which represents the local time defined by the slave clock HE) at the moment of detection of the last frame pulse by the physical layer.

Moreover, when the slave station SE receives the wireless frame that contains the message of the second type that follows the message of the first type, its synchronization device DS2 extracts from it the value T1 that it contains. The difference $T2-T1$ is then conventionally equal to the synchronization offset between slave HE and master HM clocks ($\Delta$) plus the transmission delay (D) between the master station SM and the slave station SE concerned, or $T2-T1=\Delta+D$.

The association with a wireless frame of the current value of the master counter CM can be done as indicated below, in a non-limiting way.

Figure 2:
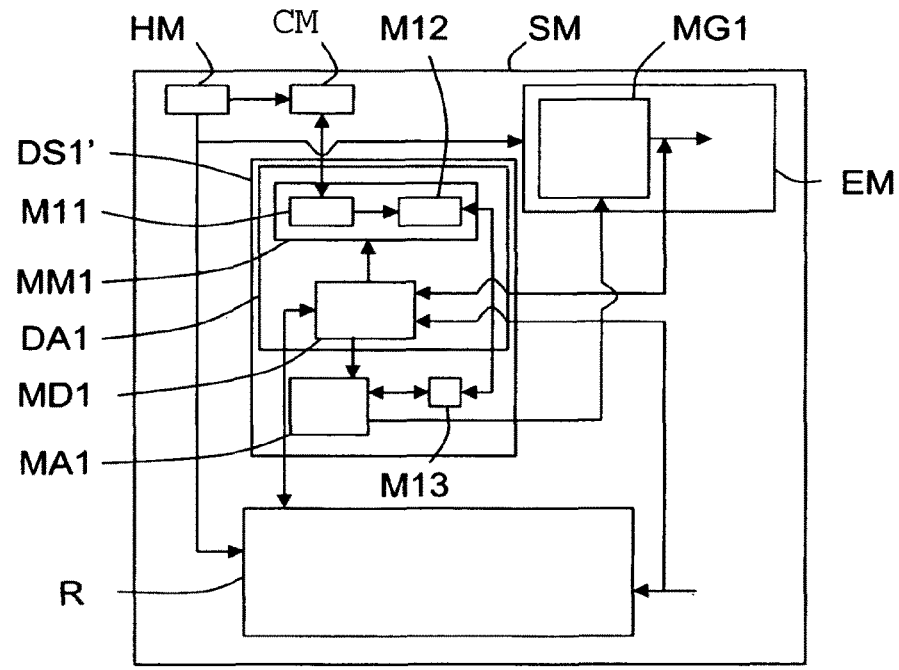

For example, and as illustrated in FIGS. 1 and 2, the first aid device DA1 comprises storage means MM1 subdivided into first M11 and second M12 parts and coupled to the master counter CM. These storage means MM1 can take any form known to those skilled in the art, and in particular the form of a memory comprising two registers coupled to each other. Preferably (for accuracy), the storage means MM1 are implemented in the form of electronic components and/or circuits ("hardware").

For example, the first storage part M11 is a first register which is for storing the sampling of the value of the master counter CM, which was obtained on detection of the very last frame pulse by the physical layer, at the moment when the detection module MD1 detects a chosen message part in the wireless frame corresponding to this last frame pulse. More specifically, when the detection module MD1 detects a chosen message part, it immediately orders the storage means MM1 to store in the first register M11 the sampling of the value of the master counter obtained on detection of the very last frame pulse, pending a full analysis of the wireless frame received. This storage is preferably done in correlation with the address of the recipient or recipients of the PTP message.

For example, the second storage part M12 is a second register which is for storing the image of the sampling of the value of the master counter CM that is stored in the first register M11 when a PTP message that has been transmitted in full (and therefore entirely analysed) is actually of the first type. This storage is therefore done before the detection module MD1 orders the first register M11 to store a new sampling of the value of the master counter CM following a new detection of a chosen message part. More specifically, if, at the end of the transmission of all of a wireless frame, the detection module MD1 notices that it contains a message of the first type, then it orders the transfer of the content (T1) of the first register M11 into the second register M12. The latter then contains the sampling of the value T1 which must be incorporated in the wireless frame which must contain the message of the second type which must be transmitted to the slave stations SE. If the detection module MD1 again detects a chosen message part in the next wireless frame, the first register M11 is then ready to store the new sampling of the value of the master counter CM obtained on the detection of the very last frame pulse by the physical layer.

It will be understood that, if the detection module MD1 notices that the wireless frame that has just been transmitted in full does not contain a message of the first type, then it does not transfer the content of the first register M11 into the second register M12.

Once the content of the first register M11 has been transferred into the second register M12, the detection module MD1 can communicate the content of the second register M12 to the (first) synchronization device DS1 for it to manage its integration in a wireless frame containing a PTP message of the second type. For example, and as illustrated in FIGS. 1 and 2, the (first) synchronization device DS1 can include storage means M13 for storing, at the initiative of the detection module MD1, the sampling of the value of the master counter CM that has just been transferred into the second register M12. The (first) synchronization device DS1 can then communicate to the frame generation module MG1 this sampling of the value of the master counter CM that is stored (temporarily) in its storage means M13 for it to incorporate it in a wireless frame of the second type.

The storage means M13 can take any form known to those skilled in the art and in particular the form of a hardware memory or registers ("hardware").

The first aid device DA1 also intervenes when the reception module RM of its master station SM receives a wireless frame containing a message of the third type and originating from a slave station SE.

More specifically, the detection module MD1 is also required to detect whether the wireless frame that is currently being received (by the reception module RM) contains at least a chosen part of a PTP message of the third type.

For example, the message part being sought is the destination IP address which, by definition according to Appendix D of the 61588 standard, has only four possible values (reserved) for a PTP message (224.0.1.129, 224.0.1.130, 224.0.1.131 and 224.0.1.132), and the destination port number, which, for a PTP message of type three (3) has the value 319 (again according to Appendix D of the 61588 standard).

If the detection module MD1 detects the message part being sought in a wireless frame currently being received, it associates with this wireless frame the sampling of the value (T4) of the master counter CM (of its master station SM) obtained on detection of the very last frame pulse by the physical layer (corresponding to the start of the reception of the very last wireless frame).

Furthermore, if, at the end of the reception of all of this wireless frame, the detection module MD1 notices that it actually contains a message of the third type, then it alerts the (first) synchronization device DS1. The latter can then supply the generation module MG1 with the image of the sampling of the value T4 that has been associated with the frame containing the message of the third type in order for it to incorporate it in a wireless frame containing a message of the fourth type which, according to the IEC 61588 standard, must be transmitted (in point-to-point mode) to the slave station that transmitted the message of the third type (in response to the latter).

The association with a wireless frame of the current value of the master counter CM can, for example, be done as indicated below using the storage means MM1. More specifically, when the detection module MD1 detects the chosen message part in a wireless frame currently being received (which can, if necessary, contain a message of the third type), it immediately orders the storage means MM1 to store in the first register M11 the sampling of the value T4 of the master counter CM obtained on detection of the very last frame pulse by the physical layer (corresponding to the start of the reception of the current wireless frame). Then, if, at the end of the reception of all of this wireless frame, the detection module MD1 notices that it contains a message of the third type, then it transfers the content T4 of the first register M11 into the second register M12. The latter then contains the sampling of the value T4 which must be incorporated in the wireless frame that must contain the message of the fourth type that must be transmitted to the slave station SE that transmitted the message of the third type.

It will be understood that, if the detection module MD1 notices that the wireless frame that has just been fully transmitted does not contain a message of the third type, then it does not transfer the content of the first register M11 into the second register M12.

Once the content of the first register M11 has been transferred into the second register M12, the detection module MD1 can communicate the content of the second register M12 to the (first) clock synchronization device DS1 for it to manage its incorporation in a wireless frame containing a PTP message of the fourth type. For example, the (first) synchronization device DS1 stores in its storage means M13 the sampling of the value of the master counter CM that has just been transferred into the second register M12. The (first) synchronization device DS1 can then communicate to the frame generation module MG1 this sampling of the value of the master counter CM that is stored (temporarily) in its storage means M13 for it to incorporate it in a wireless frame of the fourth type.

In the embodiment variant illustrated in FIG. 2, the first clock synchronization device DS1' comprises the first aid device DA1 described hereinabove with reference to FIG. 1. In this case, the first clock synchronization device DS1' comprises an analysis module MA1 which is coupled to the detection module MD1 and to any storage means M13 and which decides when it must supply a sampling of the value of the master counter (T1 or T4) to the frame generation module MG1, according to (alert) information that it receives from the detection module MD1.

Figure 3:
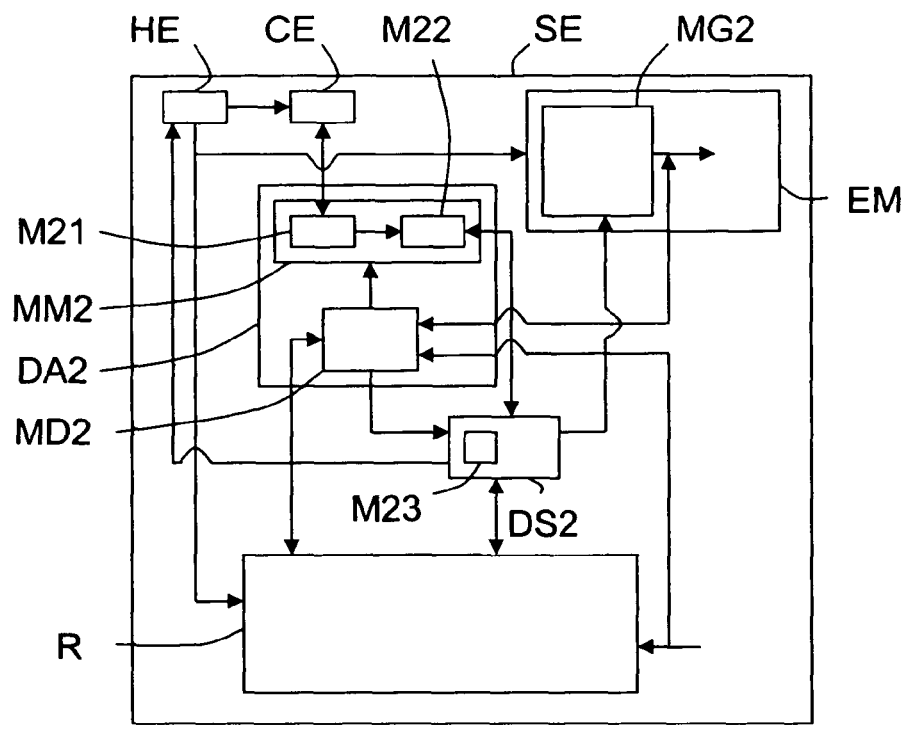
Figure 4:
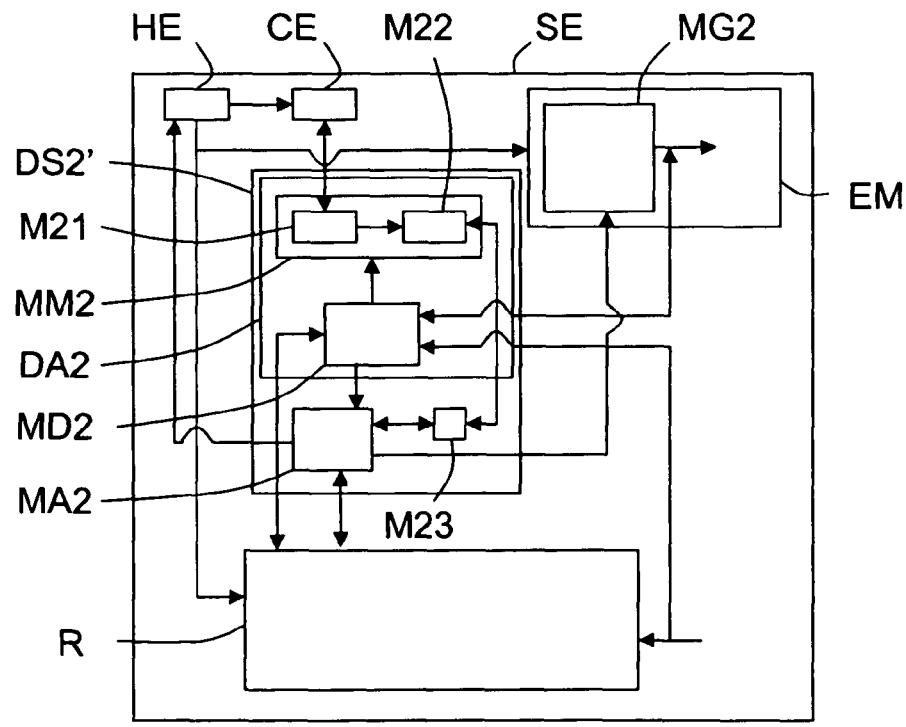

There now follows a description, with reference to FIGS. 3 and 4, of an implementation of the invention in a slave station SE.

The invention proposes to equip each slave station SE forming part of a wireless network with a time synchronization aid device DA2 and a clock synchronization device DS2. In the non-limiting example illustrated in FIG. 3, the (second) time synchronization aid device DA2 is simply coupled to the (second) clock synchronization device DS2, whereas in the non-limiting example illustrated in FIG. 4, the (second) time synchronization aid device DA1 is part of a (second) clock synchronization device DS1'.

According to the invention, a second time synchronization aid device DA2, hereinafter called second aid device DA2, comprises at least one detection module MD2 for analysing the wireless frames that are currently being received in its slave station SE. To do this, the detection module MD2 observes the wireless frames that are received by the reception module RM of the slave station SE. This reception module RM can, if necessary, be part of a transceiver.

The detection module MD2 is preferably arranged in the form of software modules which are, for example, implemented in a central processing unit (CPU) of the slave station S2.

At least a part of the second clock synchronization device DS2 is preferably arranged in the form of software modules which are, for example, implemented in the central processing unit (CPU) of the slave station SE.

The reception module RM is responsible, within the slave station SE, for receiving and processing (in particular at the physical layer level) any type of frame (wireless, of IP packets), and in particular those which form PTP messages of the first, second and fourth types.

The detection module MD2 intervenes each time the physical layer (PHY) of its master station SM detects a frame pulse among the wireless frames received by the reception module RM. Each time the physical layer detects a frame pulse, it alerts the detection module MD2 which immediately triggers an operation to sample the value of the slave counter CE. Thus, and as will be seen later, the sampling instant of the slave counter CE can be used to define the time marker of a PTP message.

In addition, the detection module MD2 preferably analyses the contents of the wireless frames (currently being received by the reception module RM) in order to detect those that contain at least a chosen part of a message of the first type.

For example, the message part being sought is, for example, the destination IP address which, by definition according to Appendix D of the 61588 standard, has only four possible values (reserved) for a PTP message (224.0.1.129, 224.0.1.130, 224.0.1.131 and 224.0.1.132), and the destination port number, which for a PTP message of type one (1) has the value 319 (again according to Appendix D of the 61588 standard).

If the detection module MD2 detects the message part being sought in the wireless frame currently being received, it associates with this wireless frame the sampling of the value (T2) of the master counter CM (of its slave station SE) obtained on detection of the very last frame pulse by the physical layer. Furthermore, if, at the end of reception of all of this wireless frame, the detection module MD2 notices that it actually contains a message of the first type, it then alerts the (second) clock synchronization device DS2. The latter can then temporarily store the image of the sampling of the value T2 that has been associated with the frame containing the message of the first type in order to use it subsequently to synchronize the slave clock HE on the master clock HM. This storage is preferably done mapped to the address of the master station SM that transmitted the message of the first type.

This storage is done, for example, in storage means M23 which can take any form known to those skilled in the art, and in particular the form of a hardware memory or registers ("hardware").

The association with a wireless frame of the current value of the slave counter CE can be done as indicated below, in a non-limiting way.

For example, and as illustrated in FIGS. 3 and 4, the second aid device DA2 comprises storage means MM2 subdivided into first M21 and second M22 parts and coupled to the slave counter CE. These storage means MM2 can take any form known to those skilled in the art, and in particular the form of a hardware memory or registers ("hardware") comprising two registers coupled to each other.

For example, the first storage part M21 is a first register which is for storing the sampling of the value of the slave counter CE, which was obtained on detection of the very last frame pulse by the physical layer, at the moment when the detection module MD2 detects a chosen message part. More specifically, when the detection module MD2 detects a chosen message part, it immediately orders the storage means MM2 to store in the first register M21 the sampling of the value of the slave counter CE obtained on the detection of the very last frame pulse, pending a complete analysis of the wireless frame received. This storage is preferably done mapped to the address of the recipient or recipients of the PTP message.

For example, the second storage part M22 is a second register which is for storing the image of the sampling of the value of the slave counter CE that is stored in the first register M21 when a PTP message that has been received in full (and therefore entirely analysed) is actually of the first type. This storage is therefore done before the detection module MD2 orders the first register 21 to store a new sampling of the value of the slave counter CE following a new detection of a chosen message part. More specifically, if, at the end of the reception of all of a wireless frame, the detection module MD2 notices that it contains a message of the first type, then it orders the transfer of the content (T2) of the first register M21 into the second register M22. The latter then contains the sampling of the value T2 which will be used subsequently.

It will be understood that, if the detection module MD2 notices that the wireless frame that has just been fully received does not contain a message of the first type, then it does not transfer the content of the first register M21 into the second register M22.

Once the content of the first register M21 has been transferred into the second register M22, the detection module MD2 can communicate the content T2 of the second register M22 to the (second) synchronization device DS2 in order for it to store it in the memory M23.

Preferably (for accuracy), the storage means MM2 are implemented in the form of electronic components and/or circuits ("hardware").

The second clock synchronization device DS2 stores the sampling of the value T2 at least until its slave station SE receives a wireless frame containing the associated message of the second type.

The second clock synchronization device DS2 is, for example, required, when the reception module RM has received a wireless frame containing a message of the second type (following a preceding wireless frame containing a message of the first type and having the same source address (that of the master station SM)), to extract from this message of the second type the image of the sampling of the value T1 of the master counter CM that it contains. Having then the value T2 (stored in the memory M23) and the value T1, it can, as indicated previously, determine the difference T2−T1 which is equal to the synchronization offset between the slave HE and master HM clocks ($\Delta$) plus the transmission delay (D) between the master station SM and the slave station SE concerned, or T2−T1=$\Delta$+D.

The second clock synchronization device DS2 then orders the generation module MG2 of the transmission module EM of its slave station SE to generate a wireless frame containing a message of the third type, addressed to the master station SM. As indicated previously, this wireless frame is generated at the physical layer (PHY-OSI model). The timestamping of the instant of transmission of this wireless frame is performed by the second aid device DA2.

More specifically, the detection module MD2 analyses the contents of the frames (generated by the frame generation module MG2 and therefore currently being transmitted) in order to detect those which contain at least a chosen part of a message of the third type.

For example, the message part being sought is, for example, the destination IP address which, by definition according to Appendix D of the 61588 standard, has only four possible values (reserved) for a PTP message (224.0.1.129, 224.0.1.130, 224.0.1.131 and 224.0.1.132), and the destination port number, which, for a PTP message of type three (3), has the value 319 (again according to Appendix D of the 61588 standard).

If the detection module MD2 detects the message part being sought in a wireless frame currently being transmitted, it associates with this wireless frame the value T3 of the slave counter CE obtained on detection of the very last frame pulse by the physical layer, and corresponding to the start of transmission of this wireless frame.

Furthermore, if, at the end of the transmission of all of this wireless frame, the detection module MD2 notices that it actually contains a message of the third type, then it alerts the second clock synchronization device DS2. The latter can then temporarily store the image of the sampling of the value T3 which has been associated with the frame containing the message of the third type in order to use it subsequently to synchronize the slave clock HE on the master clock HM.

This storage is done, for example, in the storage means M23.

The association with a wireless frame of the current value of the slave counter CE can, for example, be done as indicated hereinabove by means of the storage means MM2. More specifically, when the detection module MD2 detects the chosen octet part of a wireless frame currently being transmitted (which can, if appropriate, contain a message of the third type), it immediately orders the storage means MM2 to store in the first register M21 the sampling of the value T3 of the slave counter CE obtained on detection of the very last frame pulse by the physical layer, and corresponding to the start of transmission of this wireless frame. Then, if, at the end of the reception of all of the wireless frame, the detection module MD2 notices that it contains a message of the third type, then it transfers the content T3 of the first register M21 into the second register M22. The latter then contains the image of the sampling of the value T3.

It will be understood that, if the detection module MD2 notices that the wireless frame that has just been fully transmitted does not contain a message of the third type, then it does not transfer the content of the first register M21 into the second register M22.

Once the content of the first register M21 has been transferred into the second register M22, the detection module MD2 can communicate the content T3 of the second register M22 to the second clock synchronization device DS2 in order for it to store it in the memory M23.

The second clock synchronization device DS2 stores the sampling of the value T3 at least until its slave station SE receives a wireless frame containing the associated message of the fourth type (common address).

The second clock synchronization device DS2 is, for example, required, when the reception module RM has received from the master station SM a wireless frame containing a message of the fourth type (responding to a preceding wireless frame containing a message of the third type and designating the address of the master station SM), to extract from this message of the fourth type the image of the sampling of the value T4 of the master counter CM that it contains. Having then the value T3 (stored in the memory M23) and the value T4, it can determine the difference T3−T4 which is equal to the synchronization offset between the slave and master clocks ($\Delta$) minus the transmission delay (D), or T3−T4=$\Delta$−D.

Since the second clock synchronization device DS2 of the slave station SE then has the differences (T3−T4) and (T2−T1), it can add them together to obtain the value 2$\Delta$. It then only has to divide by two the result of this addition to obtain the value $\Delta$ of the synchronization offset of the slave clock HE relative to the master clock HM. The second clock synchronization device DS2 of the slave station SE can then address to the local slave clock HE of its slave station SE an instruction intended to cancel the value $\Delta$ of its synchronization offset.

In the embodiment variant illustrated in FIG. 4, the second clock synchronization device DS2' comprises the second aid device DA2 described hereinabove with reference to FIG. 3. In this case, the second clock synchronization device DS2' comprises an analysis module MA2 which is coupled to the detection module MD2, to the reception module RM and to any storage means M23 and which, on the one hand, decides when it must order the frame generation module MG2 to generate a wireless frame containing a message of the third type, and on the other hand, performs the mathematical operations culminating in the determination of the value $\Delta$ (of the synchronization offset of the slave clock HE relative to the master clock HM) and the associated synchronization instructions.

It is important to note that the analysis of the contents of the packets sent or received can be done either at the so-called driver layer level, when its response time is very fast, or at the so-called MAC (Medium Access Control) sublayer level, if the driver layer is not fast enough. The use of the driver layer makes it possible to avoid the higher layers (of the OSI layer model) being required to filter all the IP packets.

If the analysis is done at the driver layer level, it is the latter which is required to store the counter value samplings mapped to the address of the recipient or the source (depending on whether transmitting or receiving), and which reads a counter value sampling that it has previously stored (possibly in the case of address mapping).

If the analysis is done at the MAC sublayer level, it is the latter which is required to store the counter value samplings mapped to the address of the recipient or of the source (depending on whether transmitting or receiving), and which manages the interrupts to the driver layer so as to wake it up for it to read a counter value sampling stored by the MAC layer (possibly in the case of address mapping).

In a variant, it is possible to envisage a dedicated notification service between the MAC sublayer and the driver layer. More specifically, the MAC sublayer can generate dedicated messages addressed to the driver layer in order to directly transmit to it each counter value sampling that it has stored. Then, the driver layer, when it receives the order from the synchronization device DS1 or DS2, only has to transmit the sampling to the physical layer (PHY) of the frame generation module MG1 or MG2 for it to incorporate it in a frame containing a message of the second or fourth type.

The invention is not limited to the embodiments of first and second time synchronization aid devices, of first and second clock synchronization devices, of master and slave stations which have been described hereinabove purely by way of example; it encompasses all the variants that can be envisaged by those skilled in the art within the framework of the claims hereinbelow.

The invention claimed is:

1. Time synchronization aid device for a clock synchronization device of a master communication station of a wireless communication network specifically for transporting IP packet frames, said master station comprising a master clock defining a reference time represented by the value of a master counter, said device comprising detection means arranged, in case of detection by the physical layer of said master station of a wireless frame pulse received from said network, to trigger a sampling of the value of the master counter, wherein in the presence of a master station comprising generation means arranged to generate in the form of wireless frames of IP packets, addressed to at least one slave communication station of said network, PTP messages of a first type and of a second type, each message of the first type signalling the transmission in the message of the second type that follows it of an image of the sampling of the value that said master counter presented on its generation, said detection means are arranged to detect, following the triggering of a sampling of the value of said master counter, whether a wireless frame, which is being transmitted by said master station, contains at least a chosen part of a message of the first type, and if it does, to associate with this wireless frame said sampling of the value of the master counter, and, if the wireless frame actually contains a message of the first type, to alert said clock synchronization device in order for it to supply the image of this sampling to said generation means for them to incorporate it in the message of the second type that follows this message of the first type;

wherein the aid device comprises i) first storage means arranged to store the sampling of the value of the master counter in case of detection of said chosen message part by said detection means and ii) second storage means arranged to store said sampling of the value of the master counter stored in said first storage means when a PTP message which has been transmitted in full is actually of the first type, and said detection means being arranged, in case of detection of a wireless frame containing a message of the first type, to alert said clock synchronization device for it to supply the image of the sampling of the value that is stored in said second storage means to said generation means to incorporate it in the message of the second type that follows the message of the first type detected by said detection means, wherein the detection means are arranged to detect whether a wireless frame currently being received contains at least a chosen part of a PTP message of a third type, originating from a slave station and requesting the sending to the slave station of a PTP message of a fourth type, and if it does, to associate with this wireless frame the image of the sampling of the value of the master counter that corresponds to the last frame pulse preceding the moment of detection of this chosen part of the message of the third type, and if the wireless frame actually contains a message of the third type, to alert said clock synchronization device for it to supply said image of the sampling of the value to said generation means to incorporate it in a message of the fourth type responding to the message of the third type received.

2. Clock synchronization device for a master station of a wireless communication network specifically for transporting IP packet frames, said master station comprising a master clock defining a reference time represented by the value of a master counter, and generation means arranged to generate in the form of wireless frames of IP packets, addressed to at least one slave station of said network, PTP messages of a first type and of a second type, wherein it comprises a time synchronization aid device according to claim 1.

3. Master communication station for a wireless communication network specifically for transporting IP packet frames, said master station comprising a master clock defining a reference time represented by the value of a master counter, and generation means arranged to generate in the form of wireless frames of IP packets, addressed to at least one slave station of said network, PTP messages of a first type and of a second type, each message of the first type signalling the transmission in the message of the second type that follows it of an image of the sampling of the value that said master counter presented on its generation, wherein it comprises a time synchronization aid device according to claim 1.

4. Clock synchronization device for a master station of a wireless communication network specifically for transporting IP packet frames, said master station comprising a master clock defining a reference time represented by the value of a master counter, and generation means arranged to generate in the form of wireless frames of IP packets, addressed to at least one slave station of said network, PTP messages of a first type and of a second type, each message of the first type signalling the transmission in the message of the second type that follows it of an image of the sampling of the value that said master counter presented on its generation, wherein it comprises a time synchronization aid device comprising detection means arranged, in case of detection by the physical layer of said master station of a wireless frame pulse received from said network, to trigger a sampling of the value of the master counter, said detection means being arranged to detect, following the triggering of a sampling of the value of said master counter, whether a wireless frame, which is being transmitted by said master station, contains at least a chosen part of a message of the first type, and if it does, to associate with this wireless frame said sampling of the value of the master counter, and, if the wireless frame actually contains a message of the first type, to alert said clock synchronization device in order for it to supply the image of this sampling to said generation means for them to incorporate it in the message of the second type that follows this message of the first type, said time synchronization aid device comprising i) first storage means arranged to store the sampling of the value of the master counter in case of detection of said chosen message part by said detection means and ii) second storage means arranged to store said sampling of the value of the master counter stored in said first storage means when a PTP message which has been transmitted in full is actually of the first type, and said detection means being arranged, in case of detection of a wireless frame containing a message of the first type, to alert said clock synchronization device for it to supply the image of the sampling of the value that is stored in said second storage means to said generation means to incorporate it in the message of the second type that follows the message of the first type detected by said detection means, wherein the detection means are arranged to detect whether a wireless frame currently being received contains at least a chosen part of a PTP message of a third type, originating from a slave station and requesting the sending to the slave station of a PTP message of a fourth type, and if it does, to associate with this wireless frame the image of the sampling of the value of the master counter that corresponds to the last frame pulse preceding the moment of detection of this chosen part of the message of the third type, and if the wireless frame actually contains a message of the third type, to alert said clock synchronization device for it to supply said image of the sampling of the value to said generation means to incorporate it in a message of the fourth type responding to the message of the third type received.

5. Master communication station for a wireless communication network specifically for transporting IP packet frames, said master station comprising a master clock defining a reference time represented by the value of a master counter, and generation means arranged to generate in the form of wireless frames of IP packets, addressed to at least one slave station of said network, PTP messages of a first type and of a second type, each message of the first type signalling the transmission in the message of the second type that follows it of an image of the sampling of the value that said master counter presented on its generation, wherein it comprises a clock synchronization device according to claim 4.

* * * * *